Patented Mar. 4, 1924.

1,486,002

UNITED STATES PATENT OFFICE.

PAUL ALSLEBEN, OF BERLIN, GERMANY, ASSIGNOR TO JOHANN A. von WULFING, OF BERLIN, GERMANY.

PROCESS FOR THE PRODUCTION OF WATER-SOLUBLE DURABLE PREPARATIONS CONTAINING ACETYL-SALICYLIC ACID.

No Drawing. Application filed July 22, 1922. Serial No. 576,874.

*To all whom it may concern:*

Be it known that I, PAUL ALSLEBEN, doctor of chemistry, a citizen of the Republic of Germany, residing at Berlin, Germany, have invented certain new and useful Improvements in Processes for the Production of Water-Soluble Durable Preparations Containing Acetyl-Salicylic Acid, of which the following is a specification.

Acetyl-salicylic acid in the free state is permanent both as a powder and in tablet form, even under unfavourable conditions; but it suffers from the drawback, especially when the dose is large, that it disturbs the stomach in consequence of its acidity. Moreover, it is also not so easily absorbed as its salts. The non-poisonous salts of this acid with the alkalies and alkali earth metals have, however, the drawback of being hygroscopic, and they are liable, when they have once absorbed water, to decompose under the saponifying influence of the alkali or alkali earth metals with the separation of acetic acid.

When preserved in the ordinary pill box or glass tube packing used for medicines, tablets of these salts when exposed to a moist climate alter their colour and consistency, even in the course of a few weeks.

I have now discovered that mixtures of acetyl-salicylic acid with the carbonates of the non-poisonous alkali earth metals yield durable preparations. If, for instance, a mixture of acetyl-salicylic acid with the equivalent proportion of magnesium carbonate is brought into the tablet form, then these tablets do not undergo any decomposition, even when kept in moist climate. When they are thrown into water they dissolve quickly to a clear solution. In like manner react tablets which contain calcium carbonate in place of magnesium carbonate. Also with very finely powdered magnesium oxide or calcium hydroxide durable mixtures which are easily soluble may be obtained.

The fact that mixtures and tablets which contain the oxides or carbonates of calcium and magnesium remain durable in a damp climate could not be expected, because mixtures and tablets which contain acetyl-salicylic acid together with sodium bicarbonate decompose, although the sodium bicarbonate as such is not hygroscopic.

Having thus particularly described the nature of my invention, what I claim as new and desire to secure by Letters Patent of the United States is:

1. The process for the production of water-soluble durable preparations containing acetyl-salicylic acid, characterized by the feature that acetyl-salicylic acid is mixed in equivalent proportions with the slightly water soluble acid neutralizing compounds of the non-poisonous alkali earth metals and preferably pressed into tablets.

2. The process for the production of water-soluble durable preparations containing acetyl-salicylic acid, characterized by the feature that acetyl-salicylic acid is mixed in equivalent proportions with carbonates of the non-poisonous alkali earth metals and preferably pressed into tablets.

3. The process for the production of water-soluble durable preparations containing acetyl-salicylic acid, characterized by the feature that acetyl-salicylic acid is mixed in equivalent proportions with the carbonate of magnesium.

4. As new products the herein described tablets which contain acetyl-salicylic acid with equivalent proportions of slightly water soluble acid neutralizing compounds of the non-poisonous alkali earth metals.

5. As new products the herein described tablets which contain acetyl-salicylic acid with equivalent proportions of the carbonates of the non-poisonous alkali earth metals.

6. As new products the herein described tablets which contain acetyl-salicylic acid with equivalent proportions of the carbonate of magnesium.

In testimony whereof I affix my signature.

Dated this 6th day of July, 1922.

PAUL ALSLEBEN.